United States Patent [19]

Droessler et al.

[11] Patent Number: 4,466,699

[45] Date of Patent: Aug. 21, 1984

[54] CURVED TUNABLE FABRY-PEROT FILTER

[75] Inventors: Justin G. Droessler, Minneapolis; Anil K. Jain, New Brighton, both of Minn.

[73] Assignee: Honeywell Inc., Minneapolis, Minn.

[21] Appl. No.: 341,923

[22] Filed: Jan. 22, 1982

[51] Int. Cl.³ .............................................. G02B 5/28
[52] U.S. Cl. .................................... 350/166; 356/352
[58] Field of Search ..................... 350/163, 164, 166; 356/345, 352, 346

[56] References Cited

U.S. PATENT DOCUMENTS

| 3,449,692 | 6/1969 | Haake. | |
|---|---|---|---|
| 3,454,325 | 7/1969 | Ohm. | |
| 3,466,565 | 9/1969 | Rigrod. | |
| 3,546,620 | 12/1970 | Erickson et al.. | |
| 3,612,655 | 10/1971 | Buchan et al.. | |
| 3,699,347 | 10/1972 | Buchan et al.. | |
| 3,758,194 | 9/1973 | Daval et al.. | |
| 3,775,699 | 11/1973 | Cassels. | |
| 3,795,448 | 3/1974 | Fletcher et al. | 356/352 |
| 3,959,548 | 5/1976 | Bernal. | |
| 4,081,760 | 3/1978 | Berg. | |
| 4,196,396 | 4/1980 | Smith | 356/352 |

OTHER PUBLICATIONS

Herriott, D. R. "Spherical-Mirror Oscillating Interferometer", Applied Optics, vol. 2, No. 8, pp. 865–866.
"Fundamentals of Optics", Jenkins et al., McGraw-Hill Book Co., 1957, pp. 274–279.
"Radiation and Optics", Stone, McGraw-Hill Book Company, Sec. 16-4, pp. 398 & 399.
"Infrared Filters Using Evaporated Layers of Lead Sulphide, Lead Selenide and Lead Telluride", Braithwaite et al., Journal of Scientific Instruments, vol. 32, Jan. 1955, pp. 10 and 11.
"A Tunable Infrared Interference Filter", Smith et al., Journal of Scientific Instruments, vol. 34, No. 12, Dec. 1957, pp. 492–496.

Primary Examiner—Bruce Y. Arnold
Attorney, Agent, or Firm—Charles J. Ungemach

[57] ABSTRACT

A Fabry-Perot filter is disclosed having spaced, curved, non-concentric plates arranged with the concave surface of one plate facing the convex surface of the other plate and having means to change the spacing between the plates so as to vary the wavelength transmitted.

10 Claims, 15 Drawing Figures

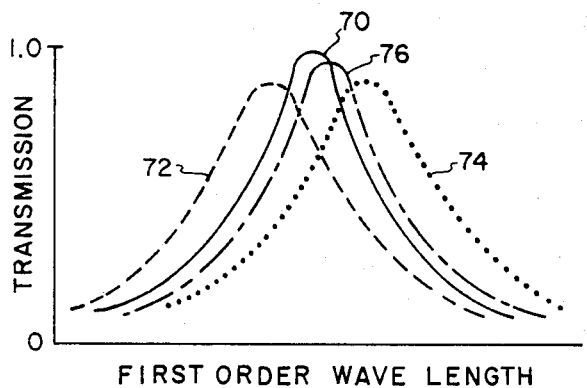
FIG. 3a
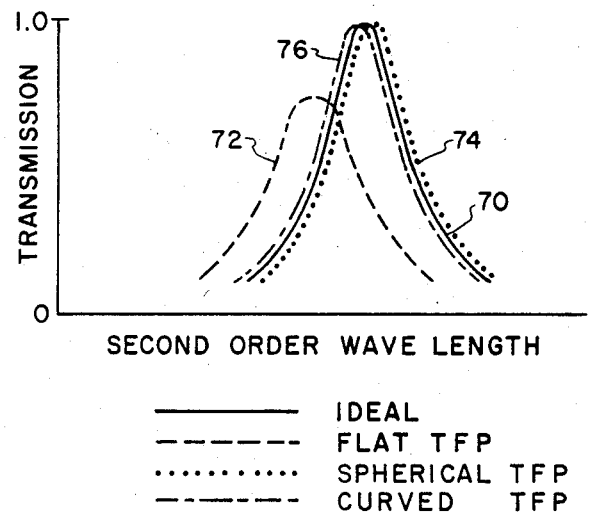
FIG. 3b
———— IDEAL
— — — FLAT TFP
·········· SPHERICAL TFP
—·—·— CURVED TFP
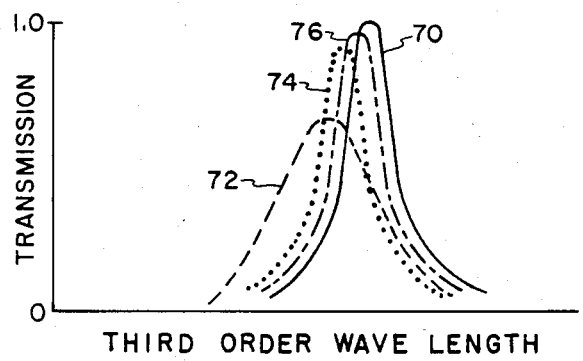
FIG. 3c
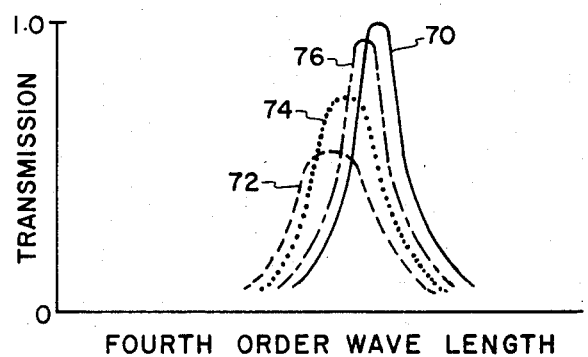
FIG. 3d
FIG. 4
| ORDER | TRANSMISSION | | | | BAND WIDTH | | | |
|---|---|---|---|---|---|---|---|---|
| | IDEAL | FLAT TFP | SPHERICAL TFP | CURVED TFP | IDEAL | FLAT TFP | SPHERICAL TFP | CURVED TFP |
| FIRST | 1.0 | 0.92 | 0.93 | 0.99 | 0.87 | 0.96 | 1.0 | 0.9 |
| SECOND | 1.0 | 0.77 | 1.0 | 1.0 | 0.48 | 0.68 | 0.48 | 0.48 |
| THIRD | 1.0 | 0.65 | 0.93 | 0.98 | 0.335 | 0.605 | 0.36 | 0.355 |
| FOURTH | 1.0 | 0.55 | 0.79 | 0.93 | 0.257 | 0.565 | 0.36 | 0.285 |

F I G. 7
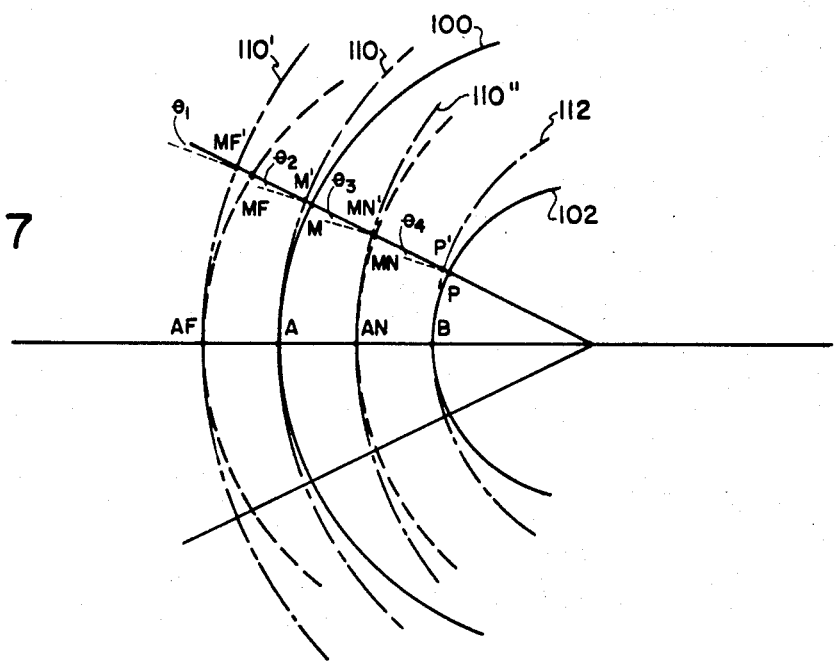
F I G. 8a
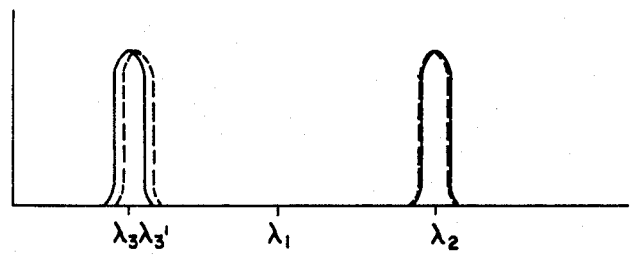
F I G. 8b
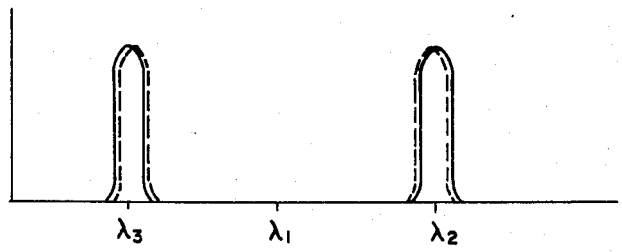

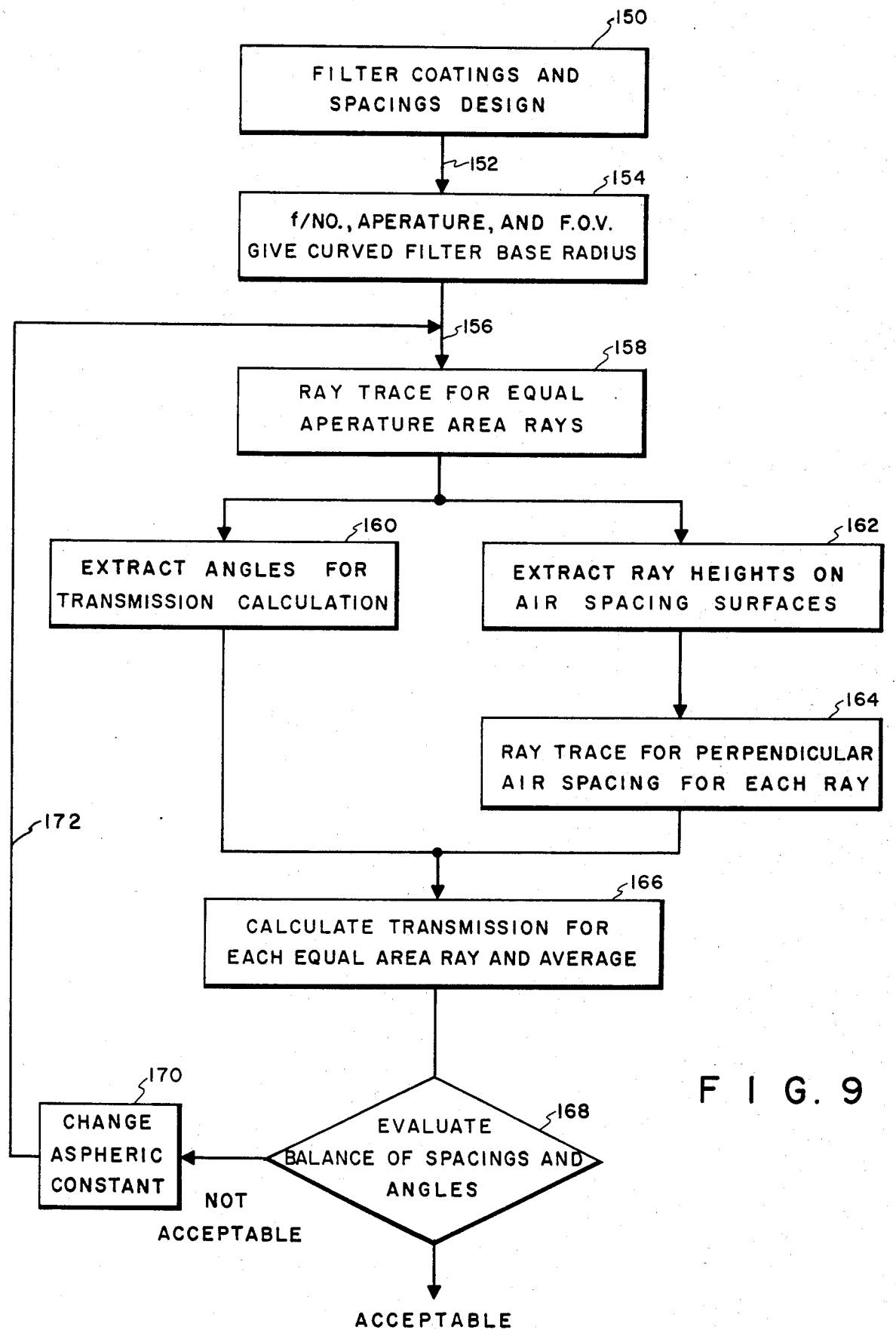

CURVED TUNABLE FABRY-PEROT FILTER

BACKGROUND OF THE INVENTION

Fabry-Perot filters are designed to pass narrow spectral ranges of light at a high efficiency with essentially no transmission of light of different wavelengths. Tunable Fabry-Perot filters are known wherein the spacing between the two plates is varied so as to pass radiation of different wavelengths as, for example, anywhere from 3 microns to 40 microns. U.S. Pat. No. 4,400,058 in the name of Ronald E. Peterson and William W. Durand and assigned to the assignee of the present invention describes and claims such a filter. A modification to this filter is found in U.S. Pat. No. 4,377,324 in the name of William W. Durand and Anil K. Jain and Ronald E. Peterson also assigned to the assignee of the present invention wherein the coatings on the plates have several layers with increasing indexes of refraction and the spacer thickness between the plates is decreased to far less than the design wavelength so as to produce a device which transmits a broader band in the vicinity of the design wavelength.

A tunable Fabry-Perot filter of an improved nature was also described and claimed in copending continuation-in-part application Ser. No. 467,619 filed Feb. 17, 1983 in the name of William W. Durand and Anil K. Jain and Ronald E. Peterson and assigned to the assignee of the present invention. In this application, three plates are used in the filter to provide, in effect, two Fabry-Perot filters, one of which passes a relatively broad band of frequencies such as was described in the above-referred to U.S. Pat. No. 4,377,324 and the other of which passes a rather narrow band of frequencies including their harmonics as was described in the above-referred to U.S. Pat. No. 4,400,058 so as to produce a filter which will pass only a rather narrow band of frequencies. As with the other applications, the spacing between the plates can be varied so as to select the desired wavelength.

All of the above-referred to prior art concerned itself with radiation which was passing with a plane wave front and the plates of the filter were accordingly planar. This was necessary so that the spacing between plates and the angle of incidence of the radiation to the plates would be maintained substantially perpendicular to the oncoming radiation.

It has been found desirable to employ a Fabry-Perot filter for use in an optical system that focusses energy, such as in an imaging system, in which event the oncoming radiation may have a sperical wave front and be focussed at some point along the optical axis. The use of a Fabry-Perot filter with planar plates would provide for inferior operation since the angle of incidence upon the plates would vary anywhere from perpendicular at the optical axis to some angle at a position off the optical axis. Accordingly, in such a system it has been considered desirable to curve the plates of the filter in such a way as they would be concentric about the point of focus of the energy. By doing this, the rays upon the surface of the plates remains perpendicular and the distance between the plates is constant. In a U.S. Pat. No. 3,775,699, issued Nov. 27, 1973, in FIG. 4, a laser mode selector is shown in which the wave front is spherical and accordingly a Fabry-Perot etalon with concentric spherical surfaces is used. A concentric spherically shaped Fabry-Perot filter is satisfactory for one specific spacing between the plates but when, as with a tunable filter, the plates are moved with respect to one another, the spacing between the plates changes in such a manner as to produce inferior operation of the filter at other than the one specific wavelength for which it is set.

BRIEF DESCRIPTION OF THE INVENTION

To overcome the problem found in the prior art, the present invention utilizes a Fabry-Perot filter with non-concentric curved surfaces or, more particularly, aspherical surfaces which are moveable with respect to each other along an axis. Since the plates are aspherical, the angle of incidence of the radiation will not be exactly perpendicular to the surface at all points along the surface and, as the plates move one with respect to the other, the distance between the plates will not remain exactly the same. The curvature of the plates, however, is chosen so that the error introduced by the angle of incidence not being perpendicular is somewhat compensated for by the difference in distance between the plates so that over the range desired for tuning the filter, a rather good filter is produced both in bandwidth and in transmission characteristics.

DESCRIPTION OF THE PREFERRED EMBODIMENT

For a more complete understanding of the invention, reference is hereby made to the drawings, in which:

FIGS. 3a, 3b, 3c and 3d are graphs showing the first, second, third and fourth order wavelengths for ideal, planar or flat, spherical or concentric, and curved or aspherical tunable Fabry-Perot filters;

FIG. 4 is a chart showing the transmission characteristics and bandwidths for the ideal, flat, spherical and curved tunable Fabry-Perot filters in each of the first, second, third and fourth orders;

FIG. 7 shows curves representing aspherical plates of the present invention;

FIGS. 8a and 8b show the transmission characteristics for the arrangement of FIG. 7; and FIG. 9 is a flow chart for calculating the asphericity of the plates.

Figure 1:
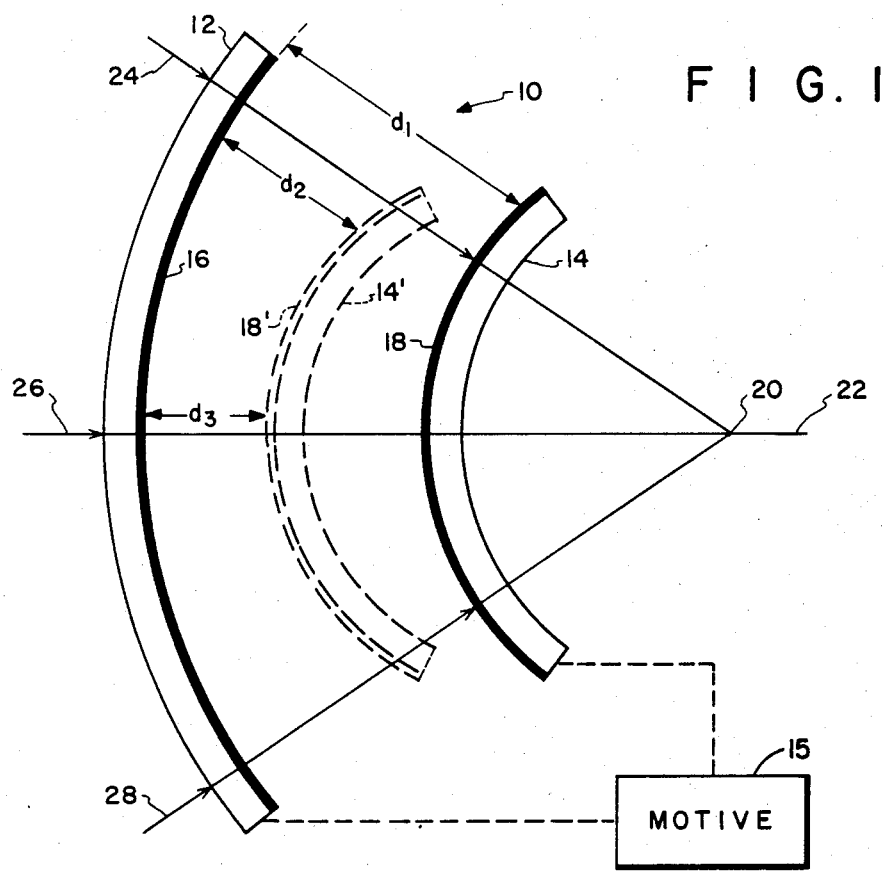
FIG. 1 is a two-plate Fabry-Perot filter with concentric spherical surfaces.

In FIG. 1, a tunable Fabry-Perot filter 10 is shown having a pair of substrates 12 and 14 having coatings 16 and 18 thereon. The substrates are shown to be spherical and concentric about a point 20 lying along an axis 22. Point 20 is the focus point for radiation travelling in directions shown by the arrows 24, 26 and 28. This radiation has a spherical wave front from some optical system such as a telescope which is focussed at point 20. It should be noted that arrows 24, 26 and 28 arrive at the substrates 12 and 14 and the coatings 16 and 18 in a direction perpendicular to the surface thereof at all points along the plates. It is also noticed that the distance $d_1$ between the two plates remains constant all over the surfaces of the two plates and accordingly, the Fabry-Perot filter will operate quite satisfactorily to filter the radiation to one specific desired wavelength.

In FIG. 1, plate 14 is also shown to be moveable along axis 22 to a new position shown by dash lines with the substrate 14' and coating 18'. Moving of plate 14 with respect to plate 12 as, for example, by a motive means 15 which may be a piezoelectric transducer, a pressure scanning device or a manual device operates, in a tunable filter, to change the wavelength to which the filter is responsive. However, it should be noted that with the concentric spherical arrangement of FIG. 1, when the substrate 14 is moved to the new position 14', that the distance $d_2$ between the plates near the ends is now larger than the distance $d_3$ along the axis 22. Because of this, the operation of the filter becomes inferior and unsuitable for many practical applications. It should also be noticed that the incident radiation no longer strikes the surface of substrate 14' and coating 18' perpendicularly except along the axis 22 and this also produces inferior operation.

While not shown in FIG. 1, it should be understood that a third plate may be added to the Fabry-Perot filter shown between substrates 14 and focal point 20 and also concentric with respect to point 20 to obtain the single narrow band selection produced by the filter described in the above-mentioned copending application Ser. No. 467,619.

Figure 2:
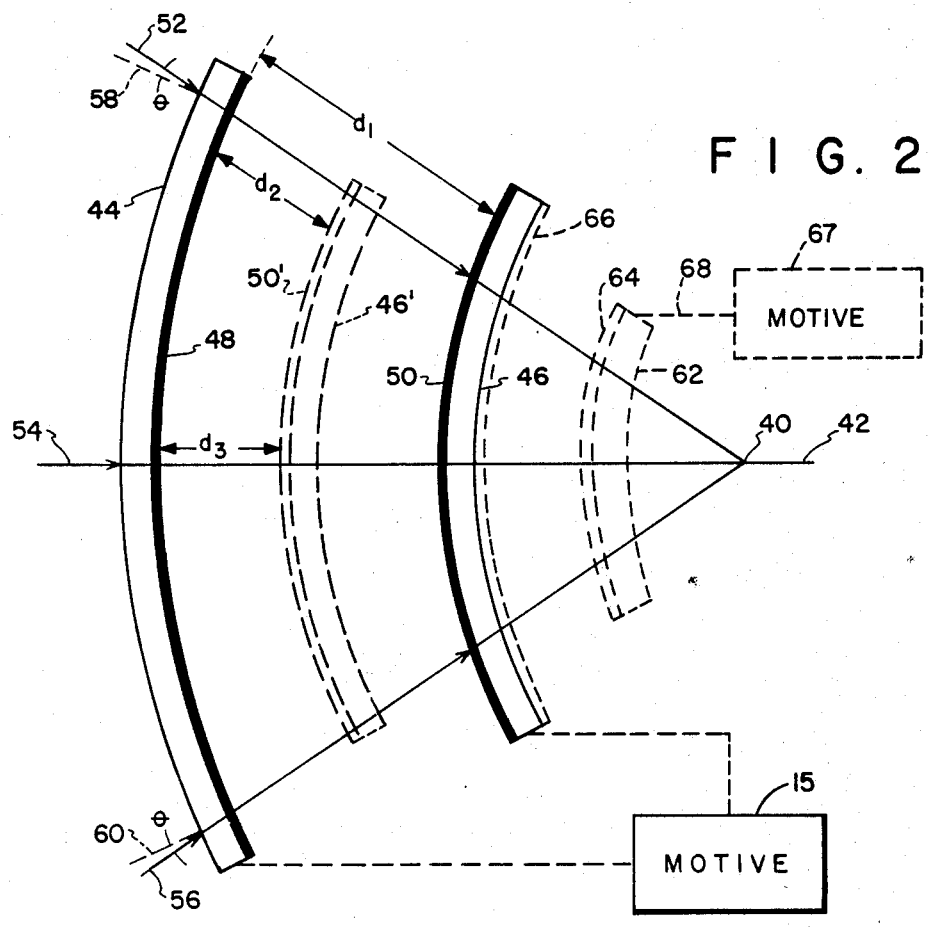
FIG. 2 is a two-plate Fabry-Perot filter having aspherical surfaces.

FIG. 2 shows a Fabry-Perot filter for use in an optical system that has a spherical wave front for radiation focussed at a point 40 along an axis 42. In the apparatus of FIG. 2, the two substrates 44 and 46 and their coatings 48 and 50 are shown to be nonconcentric about point 40. Instead the plates are somewhat flatter than would be the case in FIG. 1. It is now seen that radiation travelling along the direction shown by arrows 52, 54 and 56 is not perpendicular to the surface near the ends but is perpendicular along an axis 42. At the ends, the angle between the arrows 52 and 54 and the perpendiculars shown by dash lines 58 and 60 is shown as an angle $\theta$. Angle $\theta$ is not as far out of perpendicularity with respect to the plates 44 and 46 as was the case when plate 14 moved to the left in FIG. 1.

Also shown in FIG. 2 is the movement of plate 46 to the left to a new position shown by substrate 46' and coating 50' shown in dashed lines. Moving plate 46 to the left still produces some distortion since the distance $d_2$ between plates 44 and 46' near the ends is a little more than the distance $d_3$ between the plates along axis 42. It has been found, however, that by properly shaping the plates 44 and 46, the difference in distance between the plates which is produced with motion of one of the plates is compensated for by the difference in angle of incidence of the incoming radiation toward the ends as shown by angle $\theta$ and accordingly the Fabry-Perot filter of FIG. 2 will produce satisfactory filtering for the area in which it is tuned.

As with FIG. 1, a third plate 62 having a coating 64 on its convex face and, shown in FIG. 2 by dashed lines, may be placed between plate 46 and focal point 40 and be assymetrical in the same manner as plates 44 and 46 for purposes of fine tuning such as was described in the above-referred to copending application Ser. No. 467,619. In this event, the concave side of plate 46 would have a coating 66 thereon and the spacing between plates 62 and 46 would be changeable in the same manner as described herein for plates 46 and 44 by a motive means 67 operating through a connection shown as dashed line 68. Since the tuning principles are the same, the description used herein will be limited to the operation of the two plates 44 and 46.

The actual output of a Fabry-Perot filter constructed in accordance with the teachings of FIG. 2 can be seen in FIG. 3a–3d where the various wavelengths of the filter are compared with the ideal filter, with a flat filter and with the concentric spherical filter of FIG. 1. In FIG. 3a, for example, the transmission characteristics for the first order wavelength are shown. The transmission characteristics for an ideal filter is shown by solid line 70, that for the flat or planar faced filter is shown by dash line 72, the concentric spherical tunable filter shown in FIG. 1 is shown by dotted line 74 and the curved nonconcentric tunable filter of the present invention is shown by dash-dot line 76. It is seen from FIG. 3a, that the percent transmission of both the flat and spherical filters is somewhat lower than the ideal whereas the curved filter of the present invention is almost the same. Reference may be had to FIG. 4 wherein the figures representing the transmission characteristics of the first, second, third and fourth orders are shown for the ideal, flat, spherical and curved filters of FIGS. 3a–3d. More particularly, the transmission of the ideal filter being 1 for the first order, it is seen that the curved filter of the present invention has a 0.99 transmission whereas the flat and spherical filters have 0.92 and 0.93 respectively. The bandwidth of the ideal filter is shown in FIG. 4 to be 0.87 microns for the first order wavelength and it is seen that the curved filter of the present invention comes the closest to the ideal with the flat bandwidth being somewhat larger and the spherical being somewhat larger yet.

In FIG. 3b, the characteristics for the ideal, flat, spherical and curved filters have the same reference numerals as in FIG. 3a and it is seen that the curved filter of the present invention, as well as the spherical filter of FIG. 1, both have characteristics almost exactly the same as the ideal filter while the flat filter has moved considerably down and to the left. The reason the spherical filter matches the ideal so closely in FIG. 3b is that the concentricity of the two spheres of FIG. 1 is, chosen to transmit the second order wavelength and thus approaches the ideal situation for that particular distance between the plates. This is seen in FIG. 4 wherein the ideal transmission is 1 and both the spherical and curved filters also have a transmission of 1 whereas the transmission of the flat TFP has fallen off to 0.77. Likewise, the bandwidth is the ideal situation, as seen in FIG. 4 is 0.48 and both the spherical and curved filters have a 0.48 bandwidth whereas the flat filter has now a fairly large 0.68 bandwidth.

FIG. 3c shows the third order wavelength and it is now noticed that the flat filter, dash line 72, has moved considerably down and to the left while the spherical filter, dotted line 74, has moved somewhat down and to the left but the curved filter of the present invention, dash-dot line 76, remains close to the ideal situation shown by solid line 70. This is seen in FIG. 4 by looking at the transmission ideally being 1 with the flat transmission now having fallen off to 0.65, the spherical transmission now having fallen off to 0.93, while the curved filter's transmission is still fairly high at 0.98. Likewise, the bandwidth for the third order wavelength ideally would be 0.335 microns and the flat TFP has now moved to 0.605 microns while the bandwidth of both the spherical and curved remain close to that of the ideal being 0.36 microns and 0.355 microns respectively.

Finally, the fourth order wavelength shown in FIG. 3d shows the flat TFP, shown by dashed line 72, having moved quite far down, the transmission of the spherical TFP having moved significantly down and, although the curved filter of the present invention has somewhat moved down as shown by dash dot line 76, is still as fairly close to that shown by the ideal curve of solid line 70. This is seen in FIG. 4 with the transmission of the ideal being 1, the flat filter having dropped to 0.55, the spherical filter having dropped to 0.79 but the curved filter of the present invention having stayed up at 0.93. Likewise, with the bandwidth, the ideal situation would be 0.257 microns for the fourth order wavelength and it is seen that the flat filter now has 0.565 microns, the spherical filter has 0.36 microns but the curved filter of the present invention has a reasonably acceptable 0.285 micron bandwidth.

It is thus seen that by providing an aspherical surface to the plates of a Fabry-Perot filter when used in an optical system that has a focal point, considerably improved performance can be obtained if the surfaces are properly characterized aspherical curves. The exact curvature of the surfaces can be determined by balancing the angle of incidence effect with the nonuniform spacing effects of the filter over the required tuning range. This balance is dependent upon the desired spectral range, spectral bandwidth and F number requirements of the filter.

Figure 5:
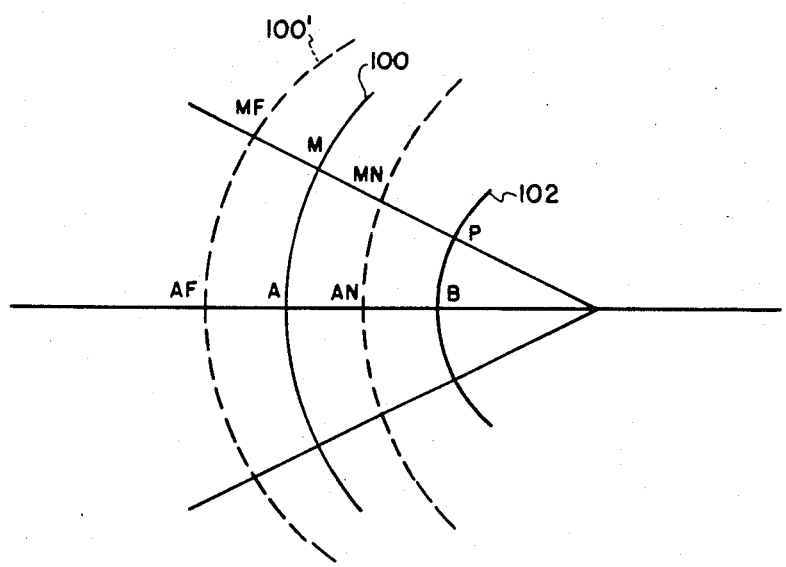
FIG. 5 shows curves representing the plates in a spherical arrangement.

Referring to FIG. 5, concentric plates AM and BP are shown as solid lines 100 and 102 respectively. These plates may transmit a wave like that shown by reference numeral 104 in FIG. 6a.

If it is desired to transmit a curve $\lambda_2$ where $\lambda_2$ is greater than $\lambda_1$, then the distance A-B in FIG. 5 should be increased to AF-B so that plate 100 would occupy a position shown as dashed line 100'. Such an arrangement of plates might produce curves like those shown by reference numerals 106 and 106' in FIG. 6b.

Figure 6A:
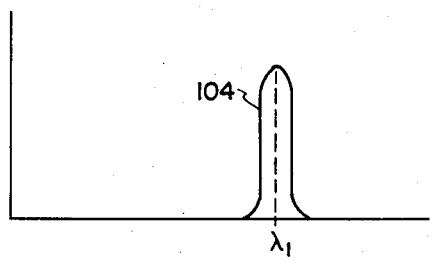
FIGS. 6a, 6b and 6c show transmission characteristics for the arrangement of FIG. 5.
Figure 6B:
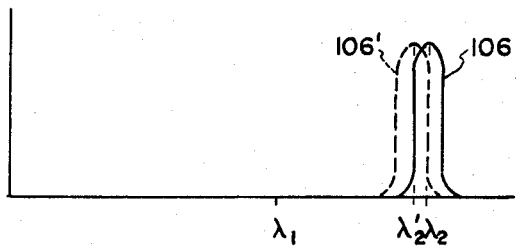

In FIG. 6b, the dashed curve 106' around $\lambda'_2$ occurs because the distance MF-P in FIG. 5 is less than the distance AF-B.

In like manner, if it is desired to transmit a curve $\lambda_3$ where $\lambda_3$ is less than $\lambda_1$, then the distance A-B in FIG. 5 should be decreased to AN-B. This might produce curves like those shown by reference numerals 108 and 108' in FIG. 6c.

Figure 6C:
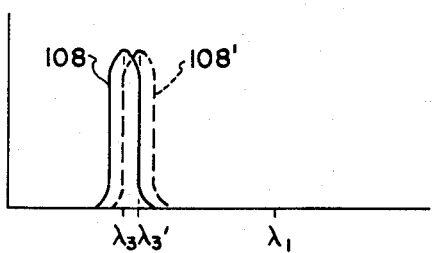

The dashed line curve 108' of FIG. 6c around $\lambda'_3$ occurs because the distance MN-P is greater than the distance AN-B.

Accordingly, as seen from FIGS. 6b and 6c, the outputs at $\lambda_2$ and $\lambda_3$ will be broader and shifted more towards $\lambda_1$ than desired.

It would be desirable to increase the distance MF-P in FIG. 5 and at the same time decrease the distance MN-P. This can be accomplished by making the plates aspherical as in FIG. 7 wherein the concentric spherical plates 100 and 102 of FIG. 5 are shown in solid lines. While the aspherical plates of the present invention are shown as dash dot lines 110 and 112 respectively. Note, in FIG. 7, that by making the plate 100 flatter, it now lies along curve AM' and the now plate 102 lies along curve BP'. Now when plate 110 is moved to the left to occupy the position shown by dash dot line 110', the distance MF'-MF is greater than the distance M'-M and this is greater than the distance MN'-MN. Thus, the distance MF'-P is greater than the distance MF-P as desired. However, when plate 110 is moved to the right to occupy the position shown by line 110", the distance MN'-P is also greater than the distance MN-P which is not desired. Accordingly, plate 102 is also made aspherical as shown by dash dot line 112 but by an amount such that the distance P'P is made greater than the distance MN'-MN. Then the distance MN'-P' will be less than MN-P and if the distance P'P is less than the distance MF'-MF, then the distance MF'-P' will still be increased.

Accordingly, ignoring for a moment the effect of nonperpendicular angle of incidence, the new transmission curves might be as shown in FIG. 8a. Note in FIG. 8a that the difference or change with respect to FIGS. 6a and 6b is greater on the high end, $\lambda_{2'}$, than on the low side, $\lambda_3$, because the distance MF'-M' is significantly greater than the distance MF-M while the distance MN'-P' is not a lot less than the distance MN-P.

This actually is an advantage because of another effect seen in FIG. 7. When the surfaces are made aspherical as at 110 and 112, the angle of incidence of radiation striking the plate becomes nonperpendicular by amounts shown in FIG. 7 as $\theta_1$, $\theta_2$, $\theta_3$ and $\theta_4$. When the angle of incidence is nonperpendicular, then the curves are shifted to the left.

Accordingly, curves as shown in FIG. 8b are actually created not those shown in FIG. 8a. Note in FIG. 8b the dashed line curves are close to the solid line curves at both extremes and satisfactory operation is obtained.

The exact positions of P' and M' in FIG. 7 have to be optimized at each point along the curve of the plate so that the effects of changing the distance between the plates and the resultant effects of changing angle of incidence best compensate each other. Furthermore, the amount of flattening of the surfaces also depends on the range of detection of radiant energy desired (the coatings and spacings design) and the F number, aperture and field of view for the optical system.

A flow chart for determining this is shown in FIG. 9.

In FIG. 9, the upper box 150 shows that the filter coatings and spacings have been determined so as to provide the desired bandwidths and the spectral range of the filter. From this, the required spacing between plates is determined as shown by arrow 152.

Box 154 shows that the F number, the aperture and the field of view of the optical system which produces the focussed radiation for this system are known. From this, the base radius of a concentric spherical plate system can be determined as shown by arrow 156.

Box 158 indicates that the aperture is divided into a number of equal concentric areas and the ray trace for rays through the centers of these areas can be calculated. From this, the angles of incidence and the distance between plates can be calculated as indicated by boxes 160, 162 and 164.

Now the transmission for each equal area ray can be calculated, summed and averaged as shown by box 166. The transmission calculations are performed by using the angles of incidence in each layer and air spacing, along with the perpendicular air spacings in the equations for $T_S$ and $T_P$ given in Military Standardization Hardbook 141, Optical Design, MIL-HDBK-141, Oct. 5, 1962, pages 20-8 to 20-12. The average transmission is then given by $T = T_S + T_P/2$. This transmission is then evaluated as shown by box 168 and if not acceptable, the spacings between the plates for each ray are changed so as to produce new aspheric constants as shown by box 170 and the information of the new spacings is combined with the base radius as shown by arrow 172 for the plates and the transmission is recalculated. This continues until the best aspheric constants are found and an acceptable transmission characteristic is obtained.

It is therefore seen that I have provided an improved Fabry-Perot filter with nonconcentric or aspherically curved surfaces so as to provide satisfactory operation for focussed radiation and which is tunable to a variety of different wavelengths. While two plates have been shown in the drawings, for simplicity, the preferred system would normally include three plates to provide the best single narrow band for filtering excellence. I do not intend to be limited to the specific showings used in describing the preferred embodiments of the present invention. I intend only to be limited by the following claims.

The embodiments of the invention in which an exclusive property or right is claimed are defined as follows:

1. A Fabry-Perot filter having spaced, curved, non-concentric plates, at least one of which is aspheric; and
   means operable to change the spacing between the plates.

2. Apparatus according to claim 1 wherein the plates have a predetermined asphericity.

3. A Fabry-Perot filter for use in an optical system which focusses radiation to a point on an axis comprising:
   a first plate mounted on the axis, the first plate being aspherical;
   a second plate mounted on the axis and spaced from the first plate, the second plate being aspherical; and
   means connected to at least one of the plates operable to cause relative motion between the plates along the axis.

4. Apparatus according to claim 3 including a third plate mounted on the axis on the other side of the second plate from the first plate, the third plate being aspherical and said means being further operable to cause relative motion between the second and third plates along the axis.

5. Apparatus according to claim 4 wherein the first, second and third aspherical plates are deformed from spherical in the same direction.

6. Apparatus according to claim 3 wherein the first and second aspherical plates are deformed from spherical in the same direction.

7. A Fabry-Perot filter having spaced, curved, non-concentric plates arranged with the concave surface of a first plate facing the convex surface of a second plate; and
   means operable to change the spacing between the plates so as to vary the wavelength transmitted.

8. A spectrally tunable filter comprising:
   first and second curved, nonconcentric plates, at least one of which is aspheric, adjustably spaced adjacent each other by an amount which is proportional to the transmitted spectral frequency, the spacing being independent of the radius of curvatures of the plates; and
   means for changing the spacing to select different spectral frequencies to be transmitted.

9. Apparatus according to claim 8 wherein the plates have a predetermined asphericity so as to transmit a desired narrow spectral band width with high transmission efficiency.

10. Apparatus according to claim 9 wherein the plates have substantially identical surface curvatures.

* * * * *